(12) United States Patent
Vandenbussche et al.

(10) Patent No.: US 11,674,700 B2
(45) Date of Patent: Jun. 13, 2023

(54) HUMIDIFIER CARTRIDGE WITH HANDLE

(71) Applicant: Ademco Inc., Golden Valley, MN (US)

(72) Inventors: Brett Vandenbussche, Minneapolis, MN (US); Tarik Khoury, Brno (CZ); Steven L Wolff, Hamel, MN (US); Pavel Marak, Brno (CZ); Jonathan Erbacher, Minneapolis, MN (US)

(73) Assignee: Ademco Inc., Golden Valley, MN (US)

( * ) Notice: Subject to any disclaimer, the term of this patent is extended or adjusted under 35 U.S.C. 154(b) by 378 days.

(21) Appl. No.: 16/868,433

(22) Filed: May 6, 2020

(65) Prior Publication Data

US 2021/0348778 A1 Nov. 11, 2021

(51) Int. Cl.
*F24F 6/14* (2006.01)
*B05B 17/06* (2006.01)
*B05B 17/00* (2006.01)
*F24F 6/00* (2006.01)

(52) U.S. Cl.
CPC ............ *F24F 6/14* (2013.01); *B05B 17/0646* (2013.01); *B05B 17/0669* (2013.01); *F24F 2006/008* (2013.01)

(58) Field of Classification Search
CPC .... B05B 17/0646; B05B 17/0669; F24F 6/14; F24F 2006/008
See application file for complete search history.

(56) References Cited

U.S. PATENT DOCUMENTS

| 6,283,458 | B1 | 9/2001 | Cox et al. | |
| 2006/0011739 | A1* | 1/2006 | Jaworski | B05B 17/0646 239/326 |
| 2009/0242662 | A1* | 10/2009 | Lu | B05B 17/0669 239/102.2 |
| 2018/0094825 | A1* | 4/2018 | Peczalski | F24F 6/14 |
| 2018/0245806 | A1* | 8/2018 | Medina | F24F 6/14 |
| 2019/0041086 | A1* | 2/2019 | Atkins, Jr. | F24F 6/14 |

FOREIGN PATENT DOCUMENTS

| CN | 106583140 A | * | 4/2017 | ......... B05B 17/0646 |
| CN | 109550632 A | * | 4/2019 | ......... B05B 17/0646 |
| KR | 20130055382 A | | 5/2013 | |
| WO | WO-2019065711 A1 | * | 4/2019 | ............. B05B 17/06 |

OTHER PUBLICATIONS

Machine translation of WO 2019065711; retrieved Jun. 29, 2022 (Year: 2022).*

* cited by examiner

*Primary Examiner* — Eric S Ruppert
*Assistant Examiner* — Hans R Weiland
(74) *Attorney, Agent, or Firm* — Greenberg Traurig, LLP; Ryan D. Sharp; David J. Dykeman

(57) ABSTRACT

A humidifier includes a container for containing a fluid; a cartridge for nebulizing the fluid, the cartridge configured to be fixed inside the container, the cartridge including a cartridge housing including a bottom side that is configured to contact a bottom of the container, a top side opposite to the bottom side; a back side; a front side; a left side; and a right side; and a handle on the top side of the cartridge housing, the handle projecting upward and away from the cartridge housing.

20 Claims, 20 Drawing Sheets

US 11,674,700 B2

HUMIDIFIER CARTRIDGE WITH HANDLE

TECHNICAL FIELD

The disclosure relates to heating, ventilation, and air conditioning (HVAC) humidifier systems.

BACKGROUND

Some forced air heating ventilation and air conditioning systems (HVAC) include a humidifier appliance to add moisture to the air. Some example humidifier appliances include steam injection, water atomization, and evaporative humidifiers. A bypass type evaporative humidifier directs air from an air stream of an HVAC system, through a moistened humidifier pad, and back into an air stream of the HVAC system. Such humidifiers often include a housing mounted to the outside of an air duct, plenum or the like of the HVAC system. The housing may include an internal cavity that houses the humidifier pad, an air inlet that directs an incoming air stream from the HVAC system to the humidifier pad, and an air outlet that directs a moistened air stream from the humidifier pad and into an air stream of the HVAC system. In some humidifiers, a powered fan is provided to help force air from the air inlet to the air outlet and through the humidifier pad. In other humidifiers, a pressure differential created by the main circulating fan or blower of the HVAC system between the return air duct and the supply air duct is used to draw air from the supply air duct, through the humidifier pad of the humidifier, and to the return duct of the HVAC system.

SUMMARY

In general, this disclosure describes systems, techniques, and devices configured to provide effective and efficient introduction of water droplets into an air flow. Specifically, this disclosure describes humidifier appliances that utilize nebulizing cartridges to produce water droplets. The water droplets are sufficiently small so as to evaporate primarily before leaving the mixing enclosure where the droplets are injected by spray nozzles. Large droplets are kept to a minimum, thus reducing condensation and water accumulation to a very small amount. An amount of water usage may be significantly less than that of a conventional evaporative humidifier of the same capacity. In some examples in accordance with this disclosure, a nebulizing cartridge includes a handle for easy installation and/or removal from a humidifier. The handle may extend vertically above a waterline of a fluid tank.

In one example, the disclosure is directed to a humidifier including a container for containing a fluid; a cartridge for nebulizing the fluid, the cartridge configured to be fixed inside the container, the cartridge including a cartridge housing including a bottom side that is configured to contact a bottom of the container, a top side opposite to the bottom side; a back side; a front side; a left side; and a right side; and a handle on the top side of the cartridge housing, the handle projecting upward and away from the cartridge housing.

In another example, the disclosure is directed to a nebulizer device comprising a cartridge for nebulizing a fluid, the cartridge configured to be fixed inside a container containing the fluid, the cartridge including a cartridge housing having a bottom side that is configured to contact a bottom of the container; a top side opposite to the bottom side; a back side; a front side; a left side; and a right side; and a handle on the top side of the cartridge housing, the handle projecting upward and away from the cartridge housing.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
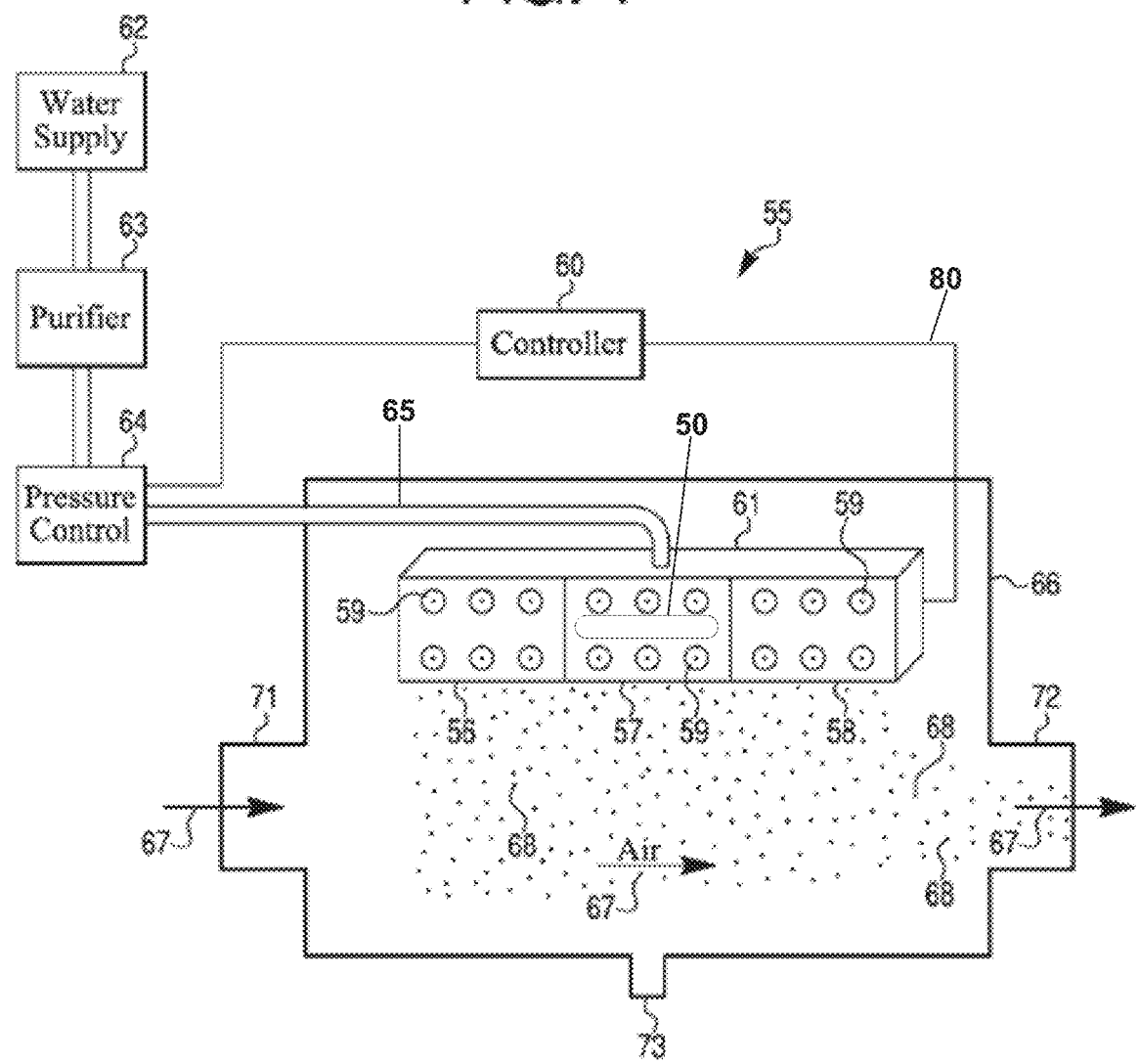
FIG. 1 is a conceptual diagram of an example system for introducing very small droplets into a flow of air.

The present system and approach may incorporate processing circuitry, such as one or more processors, computers, controllers, user interfaces, wireless and/or wire connections, and/or the like, in an implementation described and/or shown herein. This description may provide one or more illustrative and specific examples or ways of implementing the present system and approach. There may be numerous other examples or ways of implementing the system and approach. Aspects of the system or approach may be described in terms of symbols in the drawing. Symbols may have virtually any shape (e.g., a block) and may designate hardware, objects, components, activities, states, steps, procedures, and other items.

FIG. 1 is a diagram of an illustrative example of humidifying system 55. System 55 includes controller 60, water supply 62, purifier 63, pressure control 64, and enclosure 66. In the example of FIG. 1, enclosure 66 represents a fixed (e.g., non-portable) humidifier body. However, the techniques of this disclosure may similarly apply to smaller, portable humidifier devices, as detailed further below.

Enclosure 66 includes one or more nebulizer cartridges, such as arrays 56-58. Arrays 56, 57, and 58 may each contain one or more spray units 59. Water may be fed to a manifold device 61 that distributes the water to spray units 59. The water may come from a supply 62. If the water is not truly clean, like distilled water, the water may go to a purifier 63 for cleansing. Purifier 63 may use, for example, reverse osmosis for obtaining clean water from ordinary water, such as tap or faucet water from a well or city supply. The water is controlled relative to pressure with a pressure control module 64. The water may flow from pressure control 64 to a manifold device 61 via a water conveyance line or pipe 65 to distribution or manifold device 61. The water may be provided to the spray units 59 of arrays 56, 57, and/or 58. Pressure control unit 64 may have an input from a controller 60 that indicates an amount of pressure for the water in pipe 65 to the spray units 59. For instance, a pressure may be around 2.5 inches of water from a top of a reservoir under atmospheric conditions to a spray unit 59.

A line 80 from controller 60 may provide an actuation signal to spray units 59, which actuates or turns on one or more of spray units 59. Spray units 59 may be turned on separately according to their respective array. For example, spray units 59 of array 56 may be on for a given period of time or have a duty cycle, while the other arrays 57 and 58 are turned off or inactive. Spray units 59 of arrays 57 and 58 may, in turn, be actuated while the other two arrays are turned off or inactive. The spray units 59 may be actuated individually, in a pattern, or a sequence, of various kinds. As detailed further below, arrays 56, 57, and 58 may be removed and cleaned, repaired or replaced, as needed, via handle 50. There may be more or fewer than three arrays and there may be more or fewer than six spray units in each array.

System 55 may be placed in an enclosure 66 where water droplets 68 from spray units 59 are mixed in with air 67 from intake duct 71, moving past spray units 59. Droplets 68 may be small enough such that the droplets 68 result in a vapor that moves with air 67 through enclosure 66 and to an air return duct 72. Spray units 59 may eject water droplets 68 up, down, or sideways relative to enclosure 66. The droplets 68 may be ejected perpendicular, parallel, or at other angles relative to a flow of air 67.

Duct 71 may be the warmer and/or higher-pressure duct in comparison to air return duct 72, which would accommodate vaporization of droplets 68 and movement of air 67 from duct 71 to duct 72. The design may also work with reverse airflow configurations to accommodate installations where the bypass humidifier was installed on the high-pressure duct, with the bypass attached to the low pressure, resulting in backwards airflow. Enclosure 66 may also incorporate one or more components of pressure control 64, controller 60, purifier 63, and/or other items as desired.

Enclosure 66 and its components, as noted herein, may replace current humidifier systems in present HVAC systems in homes and buildings in a simplified manner. Enclosure 66 may be designed to fit in as a replacement having the same size duct connections, mounting fasteners, water, electrical connections, and more as desired. A tool-like clamp design may be used to attach enclosure 66 to an existing opening in existing ducts. A strap that wraps around an existing humidifier enclosure or body may be used to secure the new present humidifying system 55 to the ducts. These or other configurations are anticipated such that the unit may be attached securely using existing openings and/or ducts or fixtures without the use of additional tools. In permissible situations, the present system may replace a conventional system or a portion of elements of the existing system, such as a cover and/or air-hydration elements like evaporative pads and frames or steam generating elements but retain the existing or conventional enclosure.

Spray units 59 or emitters may be monitored with associated detectors, or other ways, so as to provide a notification that an array containing a poor spray unit should be removed, repaired or replaced, such as via handle 50. The water for the spray units 59 may be monitored to provide a notification in the event that purifier 63 is not working at or near optimal performance, and that repair or replacement is needed, such as, e.g., a reverse osmosis filter. Enclosure 66 may be designed to recapture droplets 68 that have not evaporated and drain them via a drain 73 to prevent their entry to low pressure or return duct 72.

Flow of air 67 may be circulated in a cyclonic vortex so that water droplets 68 are displayed in a way, such as through a clear window on enclosure 66 or other similar means for disclosure that enables viewing of water being dispersed into air 67 and to keep droplets from attaching to surfaces near spray unit 59. There is a benefit in that since there is an intention to prevent any significant amount of unevaporated water from entering the air duct 72, the vortex approach may offer an effectively extended evaporation distance that can help increase the amount of evaporation that occurs. In addition, the vortex may serve as a cyclonic separator that can drive any large droplets 68 that might occur on the sidewalls and let them drain away in a controlled way instead of injecting them into the air duct.

The arrays of spray units 59 may be grouped in a manner that the arrays can be enabled selectively, so that for any time interval, only one array is enabled, and after a number of time intervals equal to, for instance, the number of arrays, each spray unit in the respective array will have to be operating for the same length of time as each of the other arrays. A purpose for rotating which spray units are enabled may be to extend the operating life of an entire array by reducing the duty cycle for each spray unit. Visual observation through a window of enclosure 66 may aid in determining satisfactory operation of each spray unit 59. Purifier 63, such as a reverse osmosis ("RO") filtration component, may be within the same enclosure 66 as spray units 59 and drain 73, in that, for instance, seal failure may result in leaked water being directed to drain 73. A power supply and logic board of controller 60 may power multiple spray units 59 individually, or in groups, to provide desired functions of spray units 59.

Air temperature and humidity may be measured in a plenum just downstream of an associated furnace and AC unit for diagnosis so as to provide proper sizing and health of the furnace and AC unit, for example, to avoid too low temperature of heated air or too high temperature of cooled air.

Humidifying system 55 may be connected such that operation and sensor status may be conveyed to an outside computing device. System 55 may be connected such that a computing device on-board, such as controller 60, can be remotely controlled by another computing device, by recalling in a resident memory of any type.

System 55 may be connected to the internet to gather data, alert an owner about maintenance or an HVAC system issue, or other item of concern or interest, particularly relative to system 55.

In some examples in accordance with this disclosure, any or all of arrays 56,57, 58 may include a replaceable cartridge having a handle 50 for convenient installation into and/or removal from humidifier enclosure 66. For example, one or more of arrays 56-58 may periodically need to be removed and cleaned, repaired or replaced, as needed. As shown in FIG. 1, array 57 may include two rows of spray units 59 with a handle 50 disposed between the two rows. A top of handle 50 may, for example, be configured to extend above a water line in humidifier enclosure 66, such that the cartridge can be removed without the need for a person to fully or partially submerge their hand in any water inside humidifier enclosure 66. Although not depicted in FIG. 1, arrays 56 and/or 58 may also include a handle, or alternatively, arrays 56-58 may be removed via handle 50 as a single removable unit.

Figure 2A:
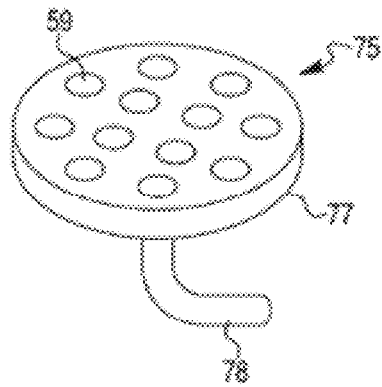
FIGS. 2A-2D are diagrams depicting various configurations of arrays for spray nozzles.

Spray units 59 of system 55 may be arranged in various configurations other than that revealed in FIG. 1. For example, FIGS. 2A-2D are diagrams of spray units 59 in various circular fashions. Spray units 59 may be arranged in a square, triangular, oval, rectangular, and other geometrical forms. Spray units 59 may be oriented to emit droplets up, down, sideways, and at various other angles, or in a combination of different directions. The geometrical forms for placing spray units 59 may be two-dimensional or three dimensional. Spray units 59 may be arranged in a three-dimensional manner which may provide certain desired effects of a respective spray unit arrangement. FIG. 2A is a diagram of a round plate layout 75 of spray units 59 on a manifold-like interface 77 with a tube or conveyance mechanism 78 for providing fluid to spray units 59. FIG. 2B is a diagram of a thick plate layout 81 with spray units 59 on the plate surface and spray units on the surface of a thick edge of the plate. A center of the plate and its spray units might be absent leaving a ring-like structure having just the thick edge with spray units 59. Such configuration may be referred to a "dog-collar."

Figure 2C:
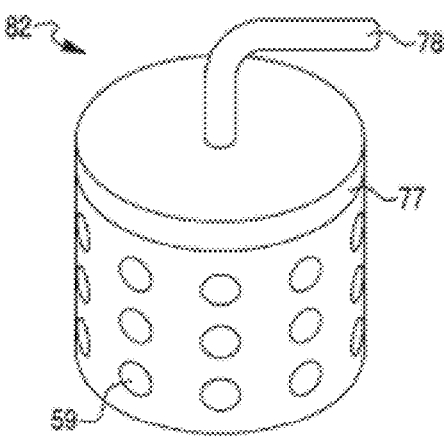
Figure 2B:
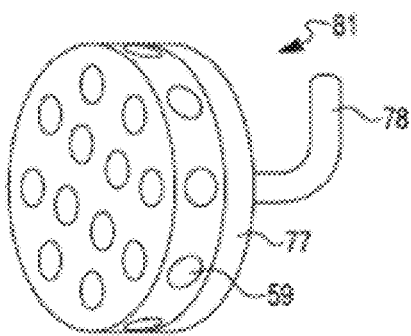
Figure 2D:
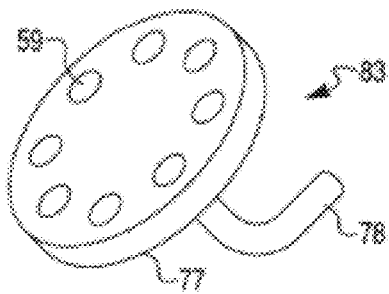

FIG. 2C is a diagram of a "drum" layout 82 having multiple rows of spray units 59 on the side surface of the drum. The bottom or the top surface may have spray units 59. FIG. 2D is a diagram of a layout 83 like that of layout 75 of FIG. 2A, but being oriented with spray units 59 at an angle, either up or down, or other ways.

Figure 3:
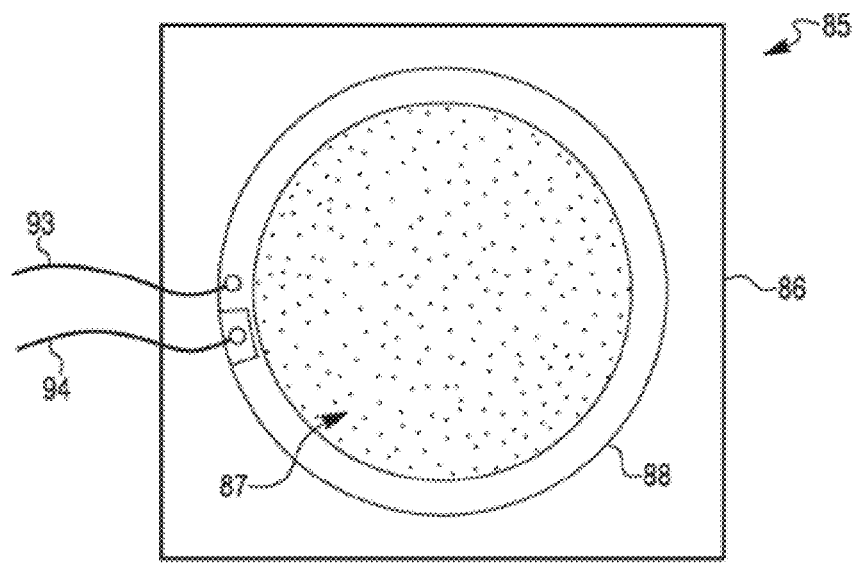
FIG. 3 is a conceptual diagram of a nebulizer that may be used as a spray nozzle.

Spray units 59 may be selected from a variety of devices such as nozzle injectors, atomizers, nebulizers, and so forth. FIG. 3 is a diagram of an example nebulizer 85. Nebulizer 85 may be a stainless-steel plate 86 having about 600 to 800 holes 87. Each hole 87 may have a diameter of five to seven microns. Other variations of nebulizer 85 may have 50 to 5000 holes in plate 86, having a diameter between 0.5 and 50 microns. A piezoelectric ring 88 may be attached to steel plate 86 encircling holes 87 in plate 86. Plate 86 may be made from other materials. Piezoelectric ring 88 may actuate plate 86 with an AC current applied to leads 93 and 94. Other kinds of mechanisms may be used to actuate plate 86. A shape of the nebulizer 85 layout of holes 87 and piezoelectric ring 88, may each have a shape other than depicted in FIG. 3. About twenty nebulizers 85 as described in FIG. 3 used as spray units 59 in system 55 (FIG. 1) may use, as an estimate, about twelve gallons of purified water per day. An amount of water used may vary, particularly in accordance with a design for system 55, associated HVAC, and nebulizers 85.

Plate 86 may have a thickness of about 0.5 mm. Holes 87 may be made within a circle of about 6.5 mm in diameter. Ring 88 of piezoelectric material may be glued to a surface of plate 86 so that holes 87 are within an inner diameter of ring 88. As an AC current or voltage is applied to ring 88, the piezoelectric material of ring 88 may shrink and expand radially. The shrinking may make metal plate 86 buckle and thus eject droplets of fluid (e.g., water).

Nebulizers 85 may be operated with plates 86 in resonance in order to increase movement of plates 86, output and efficiency of the nebulizers. A steady flow of fluid, e.g., water, may be used. During a prolonged use of nebulizers 85, for instance, in a humidifier, there may be a decrease in fluid flow due to a change of resonant frequency of nebulizers 85, for example, due to a load or stiffness change of vibrating plates 86, such as some material being deposited or removed from plates 86 or holes 87. Deposited materials may consist of minerals or other materials or particles, including organics, that are in the water. If each plate 86 is coated with a special film, e.g., hydrophobic or hydrophilic, the material deposited on plate 86, material on plate 86 may be washed out during operation of respective nebulizer 85. In some examples, more than one nebulizer may be on a plate.

Figure 4:
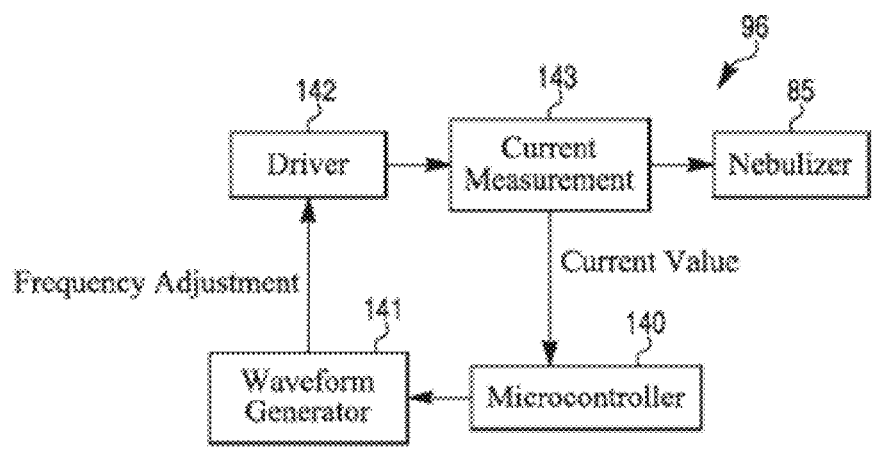
FIG. 4 is a conceptual diagram illustrating of a self-adjusting drive circuit for a nebulizer.
Figure 5:
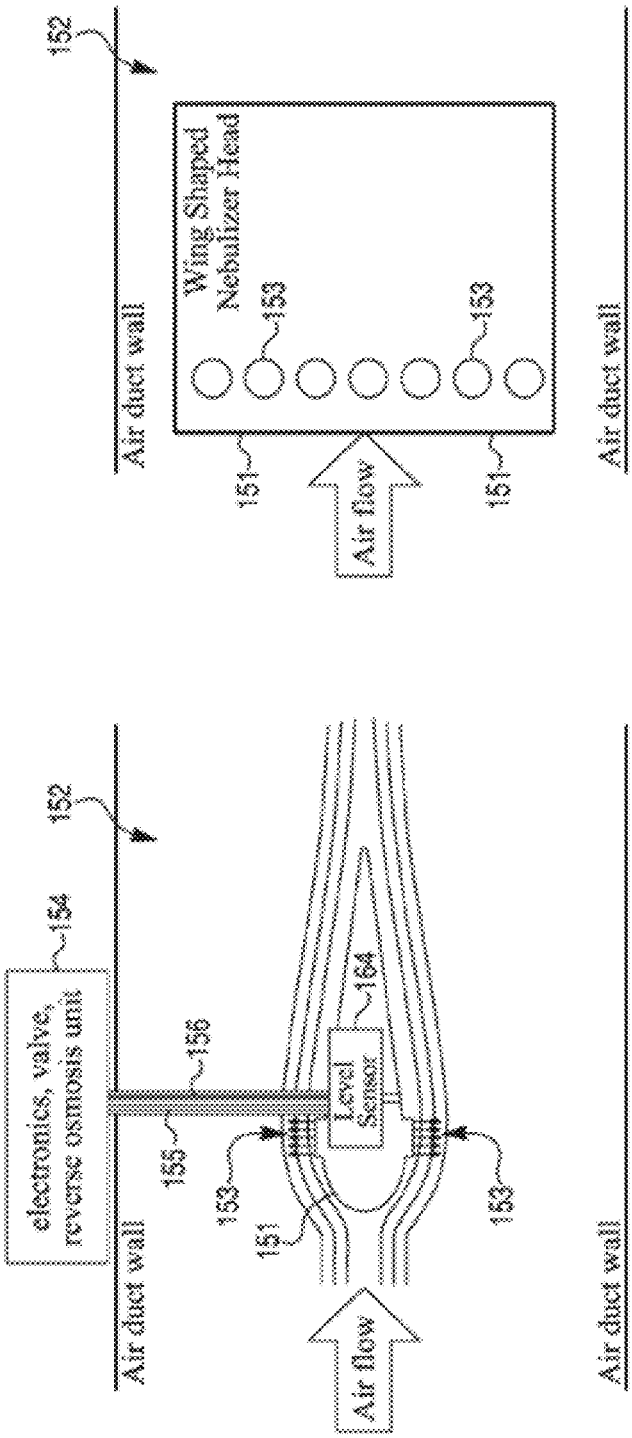
FIGS. 5A and 5B are diagrams illustrating a design for obtaining a laminar flow of air for injection of droplets.
Figure 6:
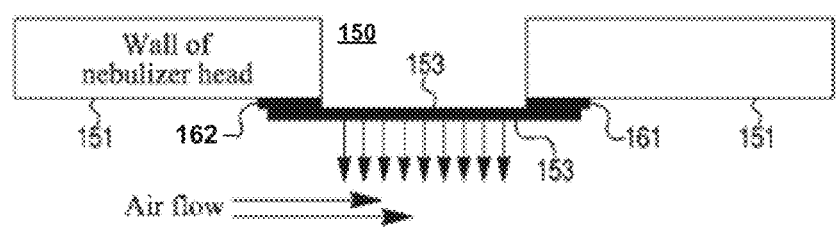
FIGS. 6 and 7 are diagrams depicting example ways in which nebulizers may be mounted on a wall of a wing-shaped nebulizer head.
Figure 7:
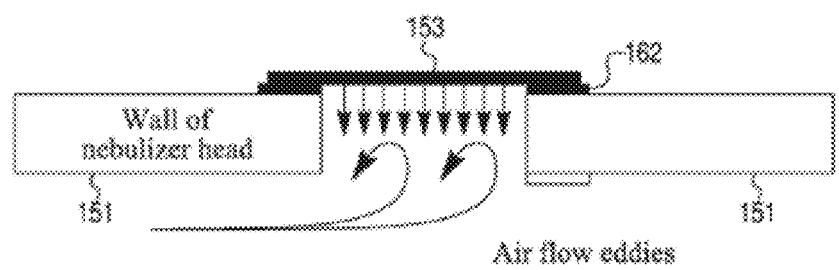

FIG. 4 is a diagram of a driver circuit 96, which may be a part of controller 60 of FIG. 1. A microcontroller 140 may provide a signal to a waveform generator 141, which may output an AC signal having a frequency that is adjustable according to a signal from microcontroller 140. The AC signal may go to a driver 142. Driver 142 may provide the signal from generator 141 with sufficient current to drive piezoelectric ring 88 (FIG. 3). Measuring circuit 143 can provide a current magnitude measurement to microcontroller 140, which may vary the signal to waveform generator 141 that adjusts the frequency so that the current magnitude achieves a maximum. Current from driver 142 may go to a nebulizer 85 or an array of nebulizers 85 (e.g., arrays 56-58 of nebulizers 59 of FIG. 1) via leads 93 and 94 to piezoelectric ring 88 of the one or more nebulizers 85. Microcontroller 140, waveform generator 141, driver 142 and current measuring circuit 143 may constitute a servo loop of circuit 96 for self-calibration and maximizing the current of the drive signals for maximizing flow by nebulizer(s) 85. Circuit 96 may ensure automatic adjustment of the nebulizer drive frequency to be at resonance in spite of drift of the resonant frequency of nebulizer 85 over time.

Relative to nebulizers 85 that may be used as spray units 59, running nebulizers dry in periods of long activity to prevent an appearance of pathogens in standing water, a dry state may be detected by observing a higher current in each nebulizer. Nebulizers 85 should not be left to run dry for long periods of time.

Determining leakage in system 55 may be done by measuring a water flow rate that exceeds the nebulizer flow rate. Each nebulizer 85 flow may be characterized periodically so that a correct amount of water is delivered to air to avoid condensation.

A design of a nebulizer and a wing to provide or improve a laminar air flow may be one way to optimize droplet mixing with air and ensuing evaporation. For instance, a humidifier that injects small water droplets 68 in an air stream or flow may cause droplet accumulation on nearby surfaces if the air flow is turbulent. Accumulated water may drip down and form a puddle that can cause water damage and encourage a growth of algae, bacteria, and/or mold. An example of such a humidifier may include a nozzle injection system or a nebulizer system.

The water issue may be solved by creating very small and uniform droplets 68 (FIG. 1), thus minimizing large droplet formation and entraining the droplets in a laminar versus a turbulent air flow. Nebulizer plates 86 may be a way of generating small droplets 68. The nozzle or hole 87 size in plates 86 should be very uniform because even a few micro holes with a larger diameter than holes 87 may result in a big quantity of large droplets. The large droplets may also form from collisions between small droplets. Large droplets may take a long time to evaporate and during that time can hit and accumulate on return air duct structure 72 (FIG. 1). Thus, the droplets should be very small, e.g., 5-7 microns, so as to evaporate before they have many chances of collision or create a deposition of water on air duct 72 features like corners or walls. The large droplets that follow a straight path due to their larger momentum may be hit by small droplets that follow a slightly turbulent direction. This activity may generate even larger droplets. However, the small droplets may be injected in a laminar air flow so that they follow parallel paths and have a lower probability of colliding and creating large droplets. Laminar air flow may be obtained with a special shape of a nebulizer head 151 as shown in diagrams of FIGS. 5A and 5B. For instance, the nebulizer head 151 may have a shape of a rectangular wing that is attached in the middle of an air duct 152. Arrays 153 of nebulizers (e.g., arrays 56-58 of nebulizers 59 of FIG. 1) may be situated at a leading edge of head 151 on the bottom and top of head 151. Electronics, a valve, and a filter (e.g., RO), may be in a box 154 with a water line 155 and electrical drive 156 connected to nebulizer arrays 153. The diagram of FIG. 5A shows a side view of wing-shaped nebulizer head 151, and the diagram of FIG. 5B shows a bottom view of the wing-shaped nebulizer head 151 of FIG. 5A. A water-level sensor 164 may be placed at or on nebulizer head 151.

As shown in FIG. 6, An edge of an opening 150 that holds nebulizer array 153, or plate 86 (FIG. 3) onto nebulizer head 151 may cause turbulence that could be removed with a waterproof gasket 162 by attaching nebulizer array 153 with double-sided sticky tape 161 or gluing array 153 to an outside wall of nozzle head 151. Such configurations may remove surface features that produce air flow eddies, and provide for an entrainment of droplets in the air flow or stream without collisions. The nozzles may also be placed on a top surface of nebulizer head 151 as in FIG. 7, and water may be delivered to the nozzles by filling a container or providing a wick.

Nebulizer head 151 may be manufactured with 3D printing. Double-sided sticky tape 161 (FIG. 6) with a thin layer of foam may enable vibration of plate 86 of nebulizer array 153, wherein the vibration force ejects droplets 68 (FIG. 1). The rest of a system may consist of a water purifier, e.g., reverse osmosis, a nebulizer driver and controller that turns the nozzle plates 86 on and off, and maintains a water level in head 151.

A nebulizer may be damaged if it operates without water. On the other hand, leakage may develop if the water level for the nebulizer gets too high. The water level may be sensed by a level detector 164 (FIG. 5A), e.g., a conductivity-based detector.

Techniques of the present disclosure may incorporate an enclosure and a humidifier that can easily replace an already-installed humidifier in many homes and buildings. The humidifiers and respective enclosures may be noted herein. FIG. 8 is a diagram of enclosure 11 for a humidifier arrangement that incorporates an emitter or nebulizer array 12 (e.g., arrays 56-58 of FIG. 1) that provides droplets 13 of water (e.g., droplets 68 of FIG. 1) into air 14 that flows from duct 15 through a volume 16 where the air 14 interacts with droplets 13 to become misty air 17 that flows down toward the bottom of enclosure 11 and out of the enclosure through a cold air return duct 18. The term "down" may mean toward the earth's surface. The term "up" may mean away from the surface of the earth. A clear window 19 may be part of enclosure 11 that enables viewing of misty air 17 flowing through enclosure 11. A drain 20 may be at the bottom of enclosure 11 for removal of water from the enclosure. Magnetic plugs 21 connect enclosure 11 to ducts 15 and 18. As shown in FIG. 8, nebulizer array 12 includes handle 50 configured to enable easy installation, removal, or replacement of nebulizer array 12 via a top port 37 of enclosure 11.

FIG. 9 is a diagram that reveals a top view 22, a front view 23, and a right or side view 24 of enclosure 11 of FIG. 8. Enclosure 11 may be regarded as a "pill type" enclosure. Top view 22 of FIG. 9 illustrates top port 37 through which nebulizer array 12 may be removed, by using handle 50 extending from nebulizer array 12.

FIG. 10 is a diagram of an enclosure 25 for a humidifier arrangement that incorporates an emitter nebulizer array 26 (e.g., arrays 56-58 of FIG. 1 or array 12 of FIG. 8) that provide droplets 27 (e.g., droplets 68 of FIG. 1) of water downward into an upward flow of air 28 from a duct 31 to a center portion of enclosure 25 and become an air and mist mixture or misty air 29 that moves downward toward a bottom of enclosure 25 into a cold air return duct 32. As shown in FIG. 10, each of nebulizer arrays 26 may include a handle 50 extending toward top port 88, through which nebulizer arrays 26 may be accessed and removed and/or installed. FIG. 11 is a diagram that reveals a front view 33, a bottom view 34 and a side or right view 35 of enclosure 25. Enclosure 25 may be oriented in different positions where the droplets 26 (e.g., droplets 68 of FIG. 1) are emitted sideways and that the mist and air 29 move sideways into duct 32. Enclosure 25 may be regarded as a "round type" enclosure. As shown in FIG. 11, top port 88 is sealed with a lid 89 which itself includes a handle 90 for easy installation and removal.

FIG. 12 is a diagram of an enclosure 38 for a humidifier arrangement that incorporates an emitter or nebulizer array 39 (e.g., arrays 56-58 of FIG. 1) that provides droplets 41 of water (e.g., droplets 68 of FIG. 1) upward into an incoming air flow 42 from an entrance or duct 84. Droplets 41 may move upward from array 39 along with air 42 and mix into a mist 43, moving upward in a center tube 44 and then downward in an outer concentric tube 45 and then upward at an inside volume of wall 47 of enclosure 38 to cold-air return duct 48. Enclosure 38 may be regarded as a "cyclone type" of enclosure due to the helical mixing of droplets 41 and air 42 (FIG. 12). As shown in FIG. 12, nebulizer array 39 includes a handle 50 mounted on a top side of nebulizer array 39, since the top side is most accessible from top port 91 of enclosure 38. FIG. 13 is a diagram that reveals a top view 51, a front view 52, and a side or right view 53 of enclosure 38. Top view 51 shows top port 91 of enclosure 38, through which nebulizer array 39 may be accessed and removed via handle 50.

FIG. 14 is a diagram of a model "A" humidifier enclosure 245. Enclosure 245 includes a lower housing 246 and an upper housing 247. There may be an existing bracket 248 for attachment of the lower and upper housings. There may be an air intake port 249 and an emitter housing 251. Also shown are a test button 252 and a plastic tinted front shell 253.

FIG. 15 is a diagram of enclosure 245 of FIG. 14 without front shell 253, thereby revealing some internal components of enclosure 245. Emitter housing 251 may contain an emitter arrangement 262, such as a nebulizer array, and an LED 263 (FIG. 18). An air guide 254 and an air output port 255 are shown in FIG. 15.

FIG. 16 is a diagram revealing an air flow 257 through enclosure 245 of FIGS. 14 and 15. Dry air may enter air intake port 249, go past the emitter in housing 251 where water droplets 258 (e.g., droplets 68 of FIG. 1) are released by the emitter into the dry air of air flow 257, whereby the air becomes humid and flows through lower housing 246, around air guide 254 into upper housing 247, and through output port 255 as humid air. Air flow 257 may follow a path that is of an extended nature for a given size of enclosure 245 to ensure evaporation of droplets 258 before reaching output port 255.

Figure 14:
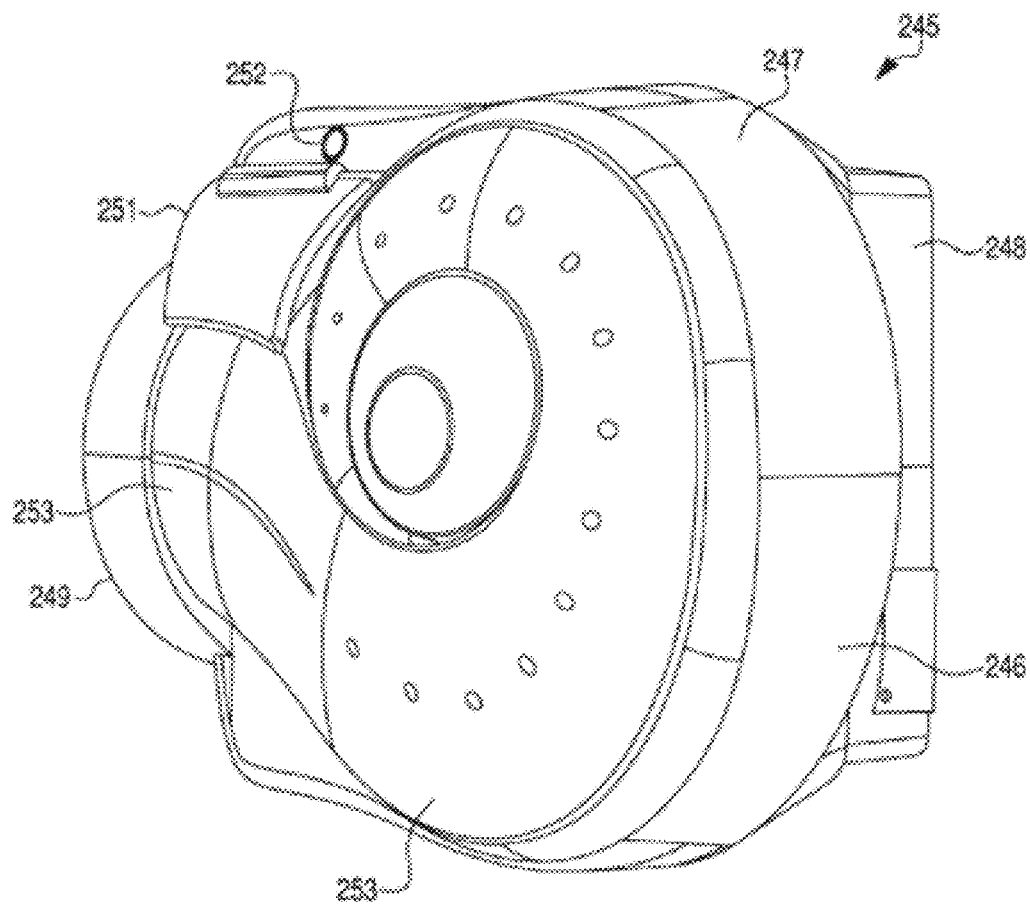
FIG. 14 is a diagram of a model "A" humidifier enclosure for a humidifier.
Figure 15:
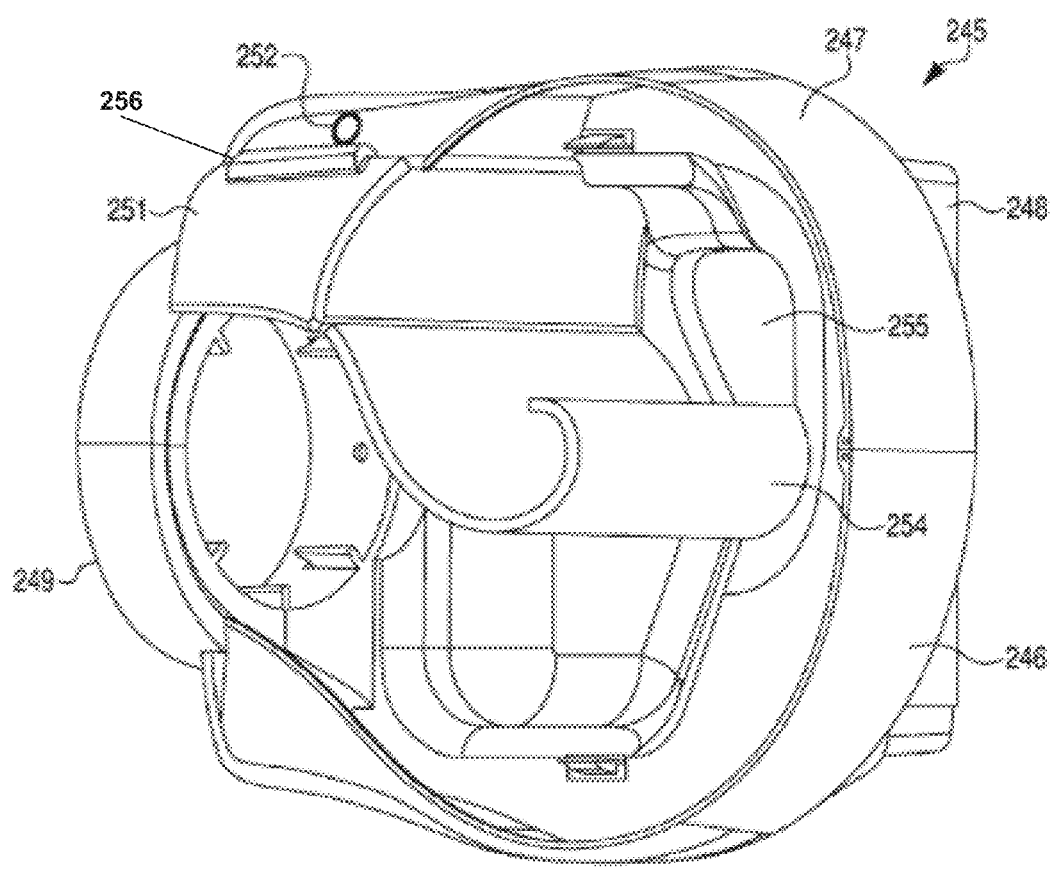
FIG. 15 is a diagram of an example humidifier enclosure with the front shell removed to illustrate some internal components in the enclosure.
Figure 16:
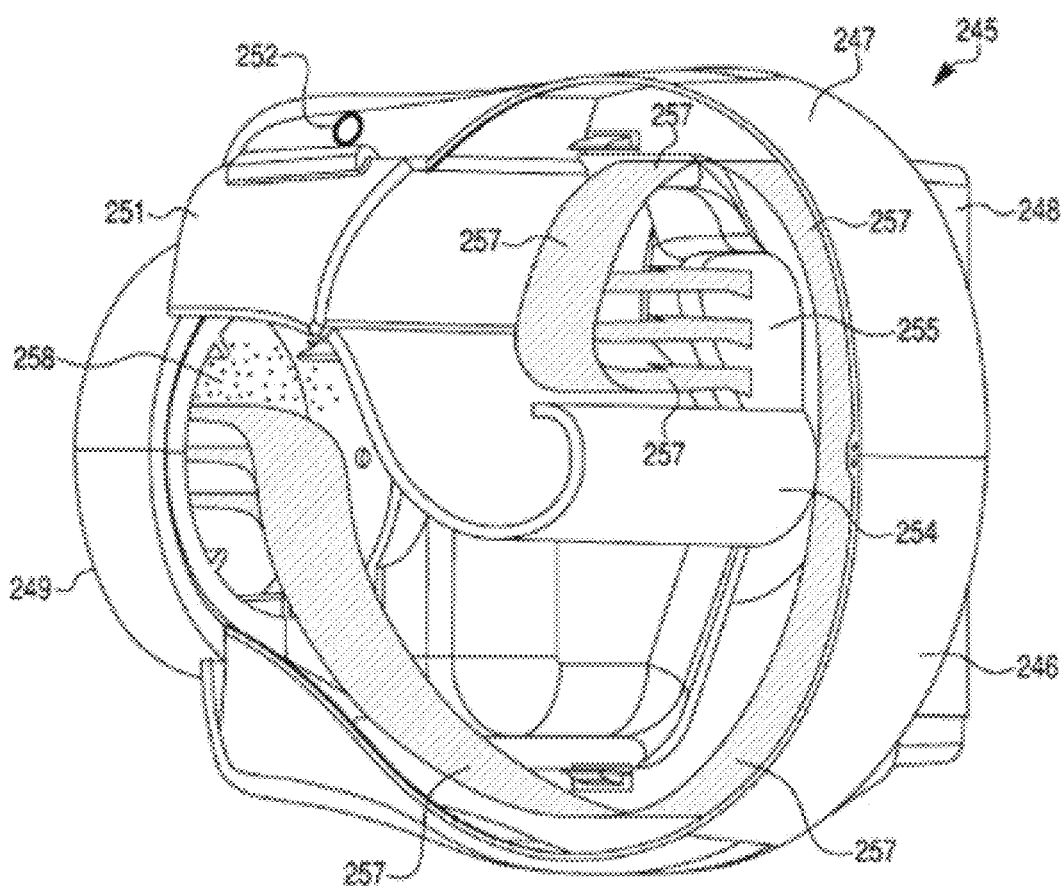
FIG. 16 is a conceptual diagram depicting an air flow through the enclosure of a humidifier.
Figure 17:
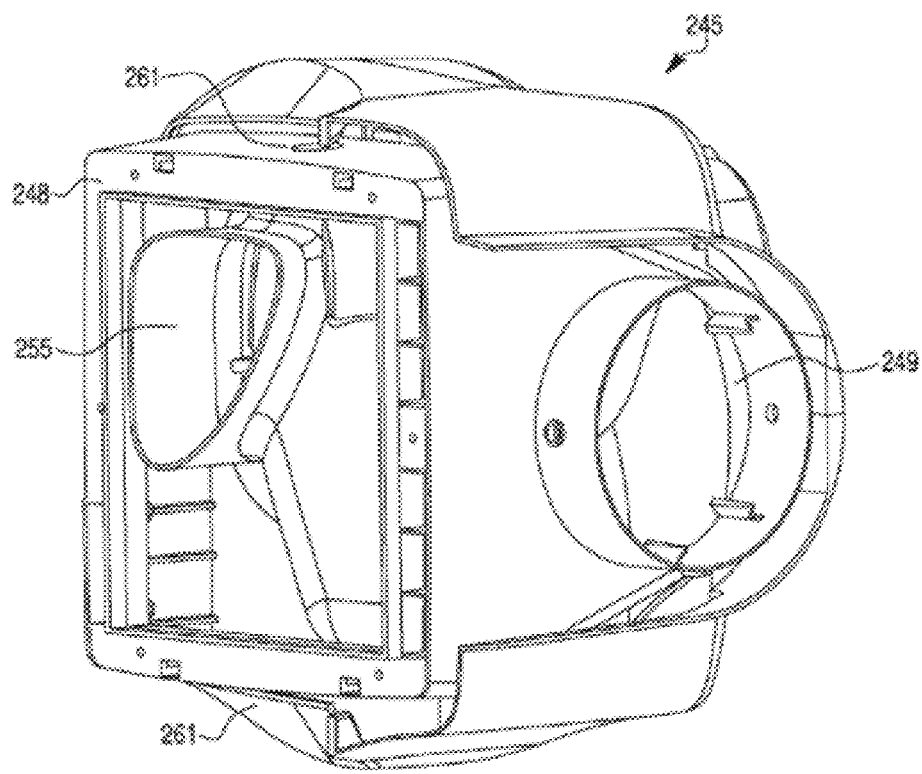
FIG. 17 is a diagram of a back view of the enclosure of a humidifier.

FIG. 17 is a diagram of a back view of enclosure 245 of FIGS. 14-16. Air intake port 249 may have a pipe placement or attachment component. Enclosure 245 may be attached to the existing bracket 248 with output 255 for humidified air moving into a return air duct. Pegs 261 may secure enclosure 245 to existing bracket 248.

Figure 18:
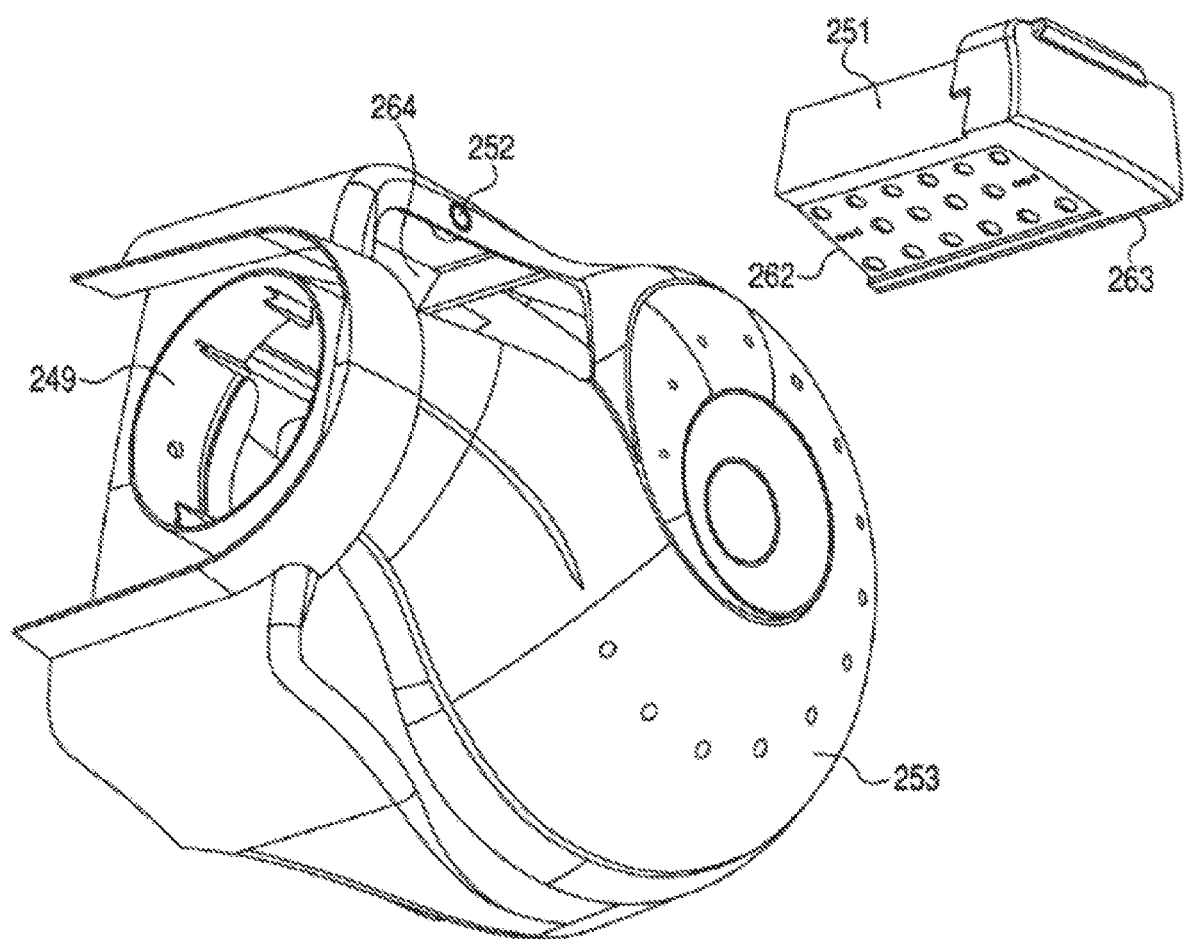
FIG. 18 is a diagram showing an emitter housing with emitters and one or more LEDs for the enclosure.

FIG. 18 is a diagram showing emitter housing 251 with emitters 262 and one or more LEDs 263. Housing 251 may fit into a cavity 264 of enclosure 245. Emitters 262 may eject micro droplets 258 (FIG. 16) into dry air coming through air intake port 249.

Figure 19:
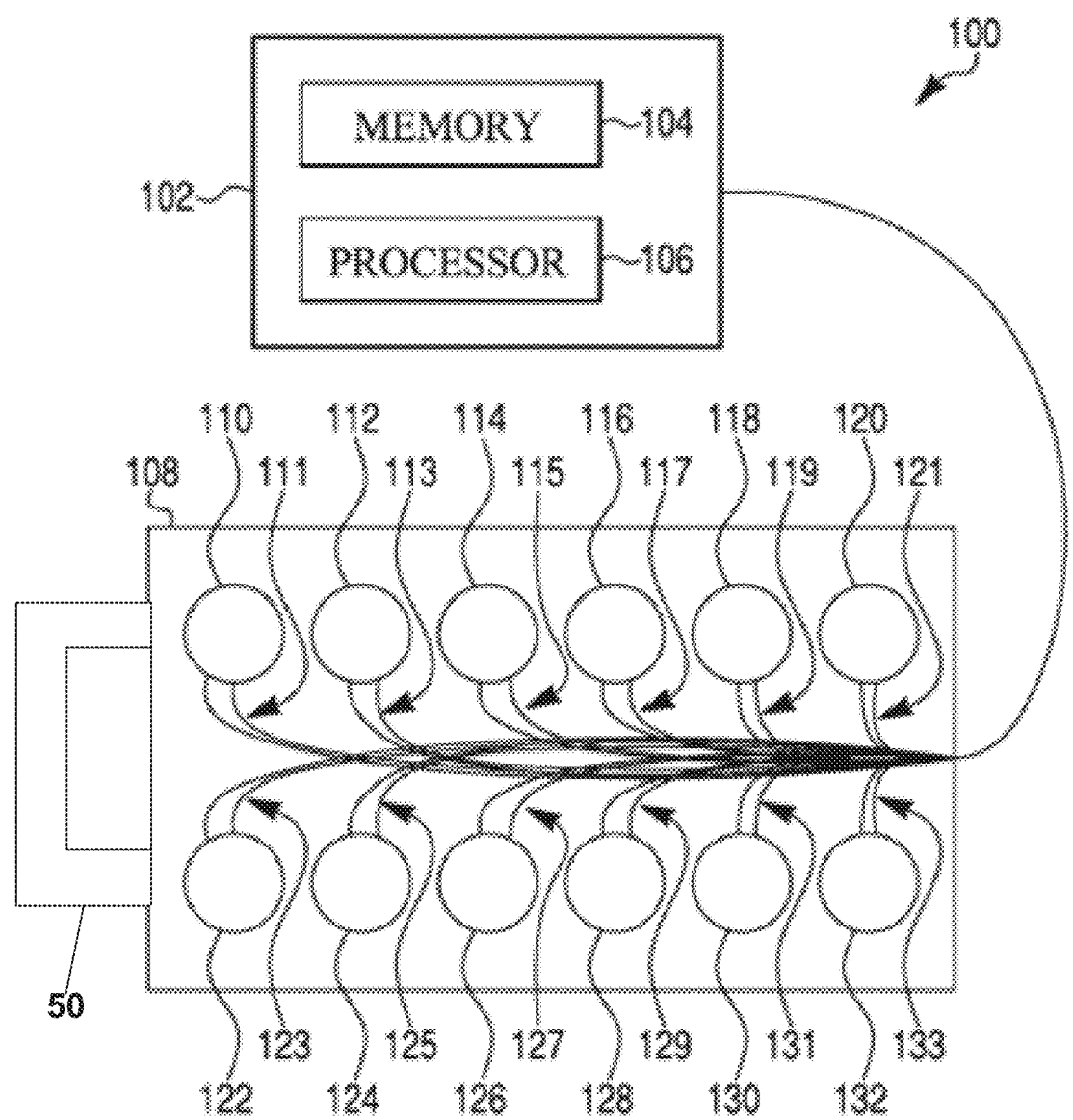
FIG. 19 is a diagram of an illustrative example of a system for humidifying.

FIG. 19 is a diagram of a system 100 for humidifying. System 100 may be an example of system 55 of FIG. 1. System 100 may incorporate a control unit 102 (e.g., controller 60 of FIG. 1) communicatively coupled to a humidifying unit 108 (e.g., arrays 56-58 of FIG. 1). Control unit 102 may, for example, be a computing device having a memory 104 (e.g., storing a set of executable instructions) and a processor 106 (e.g., configured to execute the executable instructions), though various versions of the present system are not necessarily limited. For example, control unit 102 may incorporate an integrated circuit and/or logic to perform a number of the functionalities described herein.

Control unit 102 may incorporate a memory 104 and a processor 106. Memory 104 may be any type of storage medium that can be accessed by processor 106 to perform various examples of the present disclosure. For example, memory 104 may be a non-transitory computer readable medium having computer readable instructions (e.g., computer program instructions) stored thereon that are executable by processor 106 for humidifying in accordance with one or more examples of the present disclosure.

Memory 104 may be volatile or nonvolatile memory. Memory 104 may also be removable (e.g., portable) memory, or non-removable (e.g., internal) memory. For example, memory 104 may be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 104 may be illustrated as being located in control unit 102, examples of the present disclosure are not necessarily so limited. For example, memory 104 may also be located internal to another computing resource (e.g., enabling computer readable instructions to be downloaded over the Internet or another wired or wireless connection).

Figure 20:
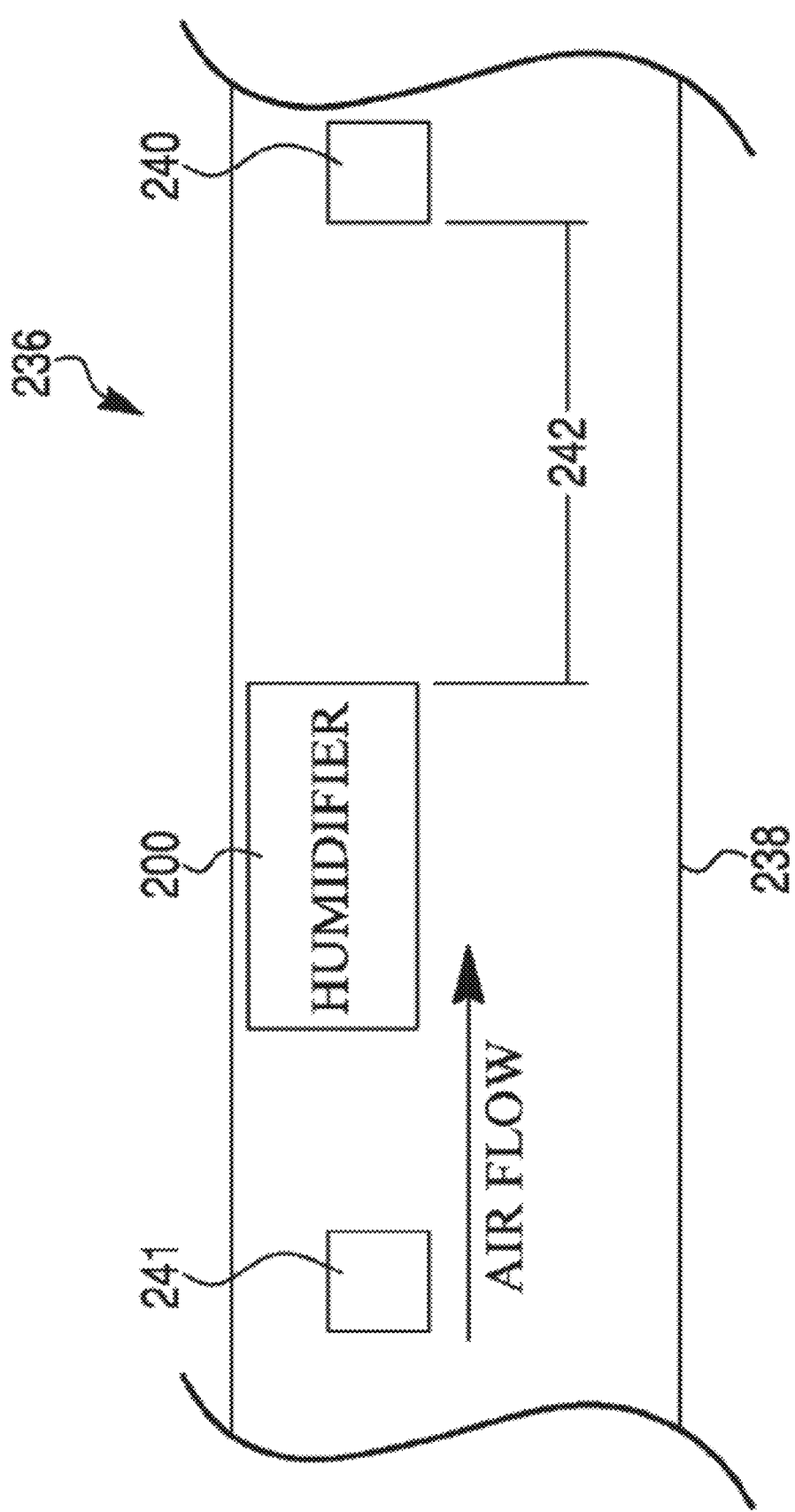
FIG. 20 is a diagram of another illustrative example of a system for humidifying.

Humidifying unit 108 may incorporate a plurality (e.g., array) of spray units. As shown in FIG. 20, humidifying unit 108 may incorporate a spray unit 110, a spray unit 112, a spray unit 114, a spray unit 116, a spray unit 118, a spray unit 120, a spray unit 122, a spray unit 124, a spray unit 126, a spray unit 128, a spray unit 130, and a spray unit 132 (sometimes generally herein referred to as "spray units 110-132"). Although 12 spray units may be illustrated in the example shown in FIG. 19, systems implemented in accordance with the present disclosure are not necessarily limited to a particular number of spray units.

As shown in FIG. 19, each of spray units 110-132 may be connected (e.g., communicatively coupled) to control unit 102 by a respective pair of wires. Spray unit 110 may be connected via wires 111, spray unit 112 may be connected via wires 113, spray unit 114 may be connected via wires 115, spray unit 116 may be connected via wires 117, spray unit 118 may be connected via wires 119, spray unit 120 may be connected via wires 121, spray unit 122 may be connected via wires 123, spray unit 124 may be connected via wires 125, spray unit 126 may be connected via wires 127, spray unit 128 may be connected via wires 129, spray unit 130 may be connected via wires 131, and spray unit 132 may be connected via wires 133 (the wires illustrated in FIG. 19 may sometimes be cumulatively referred to herein as "wires 111-133").

Accordingly, control unit 102 may communicate with and/or control an operation of (e.g., activate and/or deactivate) each of spray units 110-132 independently (e.g., individually). Each of spray units 110-132 may incorporate a spray nozzle. For example, each of spray units 110-132 may incorporate an ultrasonic atomizer and/or nebulizer having a piezoelectric element (e.g., ceramic, crystal, and so forth) attached to a metal plate with an array of small openings (e.g., holes), for instance (e.g., 5 microns in diameter). In an ultrasonic atomizer, voltage applied across the piezoelectric element (e.g., via any of the wires 111-133) may cause the element to vibrate and expel water droplets through the openings (e.g., a fine mist of water). The present system is not necessarily limited to a particular type of spray unit and may incorporate various devices configured to disperse water (e.g., fine water droplets) into air.

As shown in FIG. 19, humidifying unit 108 also includes handle 50. Handle 50 is configured to enable or facilitate the installation and/or removal of humidifying unit 108 from a larger enclosure (not shown), such as a fluid container or other humidifier housing.

Being modular, system 100 illustrated in FIG. 19 may allow for the minimization of condensation upon any portion of humidifying unit 108. Because condensation may release heat, air conditioning units may use increased energy to maintain cool temperature levels in some other approaches. The present system may regulate a length of activation time and/or an amount of water sprayed by one or more spray units of a humidifying unit such that the sprayed water is evaporated rather than condensed. Reducing condensation may incorporate, for instance, rotating one or more spray units.

FIG. 20 is a diagram of a system 236 for humidifying. System 236 may, for example, combine a cooling system (e.g., an air conditioner) with a humidification system (e.g., a humidifier 200). System 236 may make use of a principle that a rate of water droplet evaporation is proportional to a diameter of the water droplet squared, and inversely proportional to a difference between a dry bulb temperature and a wet bulb temperature. Another principle used may be that a time of flight (e.g., through a duct) of water droplets before they reach a surface on which they may be deposited is inversely proportional to a velocity of the air (e.g., the fan speed setting in a forced air conditioning system). Accordingly, in such a system, depending on a temperature of the air, a humidity, and a speed of the fan, a target (e.g., desired) cooling and/or humidification rate, may be controlled by varying an amount of water released by the humidifier.

Additionally or alternatively, a target cooling and/or humidification rate may be controlled by varying an air speed passing (e.g., passing by, over, under, across, and so on) a humidifier. The air speed may be proportional and/or related to a speed (e.g., speed setting) of a fan of an HVAC system associated with the space.

System 236 may incorporate a humidifier 200 (e.g., a humidifier analogous to system 100 (FIG. 19) and a sensor unit 240 inside an air duct 238 (illustrated as a cross-section of a portion of a duct in FIG. 20). Sensor unit 240 may be located a particular distance 242, in a direction of air flowing through the duct, from humidifier 200.

Though not necessarily shown, system 236 may incorporate a fan. The fan may be in data communication with a control unit (e.g., control unit 102 of FIG. 20) through a wired and/or wireless connection. The fan may have a fixed speed, or the fan may have a number of discrete speed settings, or the fan speed may be continuously adjustable over a range of speeds. There may be an input device configured to adjust a speed of a fan (e.g., to provide desire cooling and/or air flow).

Sensor unit 240 may incorporate a number of sensors. Although sensor unit 240 is illustrated as a single component, various adaptations sensor unit 240 may exist, in accordance with the present system. For example, sensor unit 240 may incorporate one or more temperature sensors. Temperature sensors may be configured to determine (detect, measure, and/or acquire) dry bulb temperature(s) inside duct 238.

Additionally, sensor unit 240 may incorporate one or more relative humidity sensors. For example, the wet bulb temperature may be inferred from humidity and temperature measurements using a known relationship (e.g., dependence), which may be represented in a table and/or equation, for instance. Such examples are not necessarily to be taken in a limiting sense; rather, sensor unit 240 may incorporate any number and/or type of sensor configured to determine various parameters associated with the air flowing through duct 238.

System 236 may incorporate an upstream sensor unit 241. Upstream sensor unit 214 may incorporate one or more temperature sensors and/or relative humidity sensors in a manner analogous to sensor unit 240, for instance. Upstream sensor unit 241 may be in communication with a control unit (e.g., control unit 102, noted in connection with FIG. 19) through a wired and/or wireless connection, for instance.

Upstream sensor unit 241 may be used in conjunction with sensor unit 240 to determine change(s) in temperature and/or humidity caused by humidifier 200. Locating upstream sensor 241 immediately upstream from humidifier 200 may allow a system of the present disclosure to moderate and/or finely tune one or more operations of humidifier 200.

As air flows through duct 238, humidifier 200 may disperse water droplets which can be carried through the air along distance 242. Distance 242 may be determined and/or selected such that the water droplets released from humidifier 200 have sufficient time to evaporate (e.g., sufficient time for humidity mixing in the air) before reaching sensor unit 240, for instance. Measurements associated with the flowing (e.g., flowing and humidified) air may be taken by sensor unit 240 and used by systems of the present disclosure to vary an amount of water released by humidifier 200, for instance, in controlling and/or maintaining a target cooling and/or humidification rate.

The present system may incorporate maintaining relative humidity within a particular humidity range. That is, it may maintain relative humidity below a first threshold and above a second threshold. A control unit may be configured to receive an indication of the relative humidity and an indication of the temperature and cause a modification of an operation of the humidifying unit in response to at least one of the relative humidity and the temperature exceeding a particular threshold.

For example, a temperature difference between dry bulb temperature and wet bulb temperature may be kept below 5 degrees Celsius (e.g., $T_{dry\_bulb} - T_{wet\_bulb} = 5°$ C.). Additionally, the temperature at sensor unit 240 may be maintained above a particular threshold (e.g., greater than 15 degrees Celsius). Humidity may be controlled by keeping relative humidity on a curve corresponding to the difference between dry bulb temperature and wet bulb temperature. In the example where such a difference may be 5 degrees Celsius, the curve may be represented by:

$$0.0216*T^2 + 1.8944*T + 30.656.$$

The curve may be derived from various properties of humid air by maintaining the difference between the dry bulb temperature and wet bulb temperature at 5 degrees Celsius, for instance. It is to be understood that a different curve would correspond to a different temperature difference (e.g., a different curve would result from a difference between the dry bulb temperature and wet bulb temperature being 7 degrees Celsius) as well as other factors.

For increased temperature differences (e.g., 7 degrees Celsius), higher air speed and/or smaller duct size or sizes may be used. Increased temperature differences may be used in the system having larger droplets (e.g., if droplet diameter increases by a factor of 1.41, temperature difference may increase two-fold).

Droplet size may be kept constant by maintaining parameters of spray units (e.g., nozzles). For example, droplet size may be kept constant by keeping the spray unit frequency and/or actuation voltage under a threshold at which the droplets may tend to merge into a continuous stream of water.

To control humidity, the present system may adjust a number of spray units that are activated and/or deactivated. The activation and/or deactivation may be responsive to a temperature exceeding a particular threshold. For example, a threshold temperature may be established (e.g., 16 degrees Celsius and/or 8 degrees Celsius below a set point of a thermostat associated with humidifier 200). Then, if a temperature determined by sensor unit 240 increases above the threshold temperature and a relative humidity determined by sensor unit 240 decreases below the curve, a spray unit (e.g., spray unit 122) may be activated.

If the thermostat is not requiring cooling, the threshold temperature may be higher (e.g., 20 degrees Celsius and/or 2 degrees Celsius below the thermostat set point), so the cooling may not be as pronounced as previously discussed, but humidification may still be occurring. Thus, for various temperatures and velocities of incoming air, the present system may reduce (e.g., prevent) condensation by ensuring that water droplets are evaporated (rather than condensed).

The present system may deactivate humidifier 200 if relative humidity is determined by sensor unit 240 to exceed a particular threshold (e.g., 35%). In such instances, air conditioning (e.g., traditional air conditioning), rather than humidification, may be used to provide cooling. The present system may accordingly cause a modification of an operation of the humidifying unit in response to the relative humidity exceeding a particular threshold and/or the temperature exceeding a particular threshold.

Figure 8:
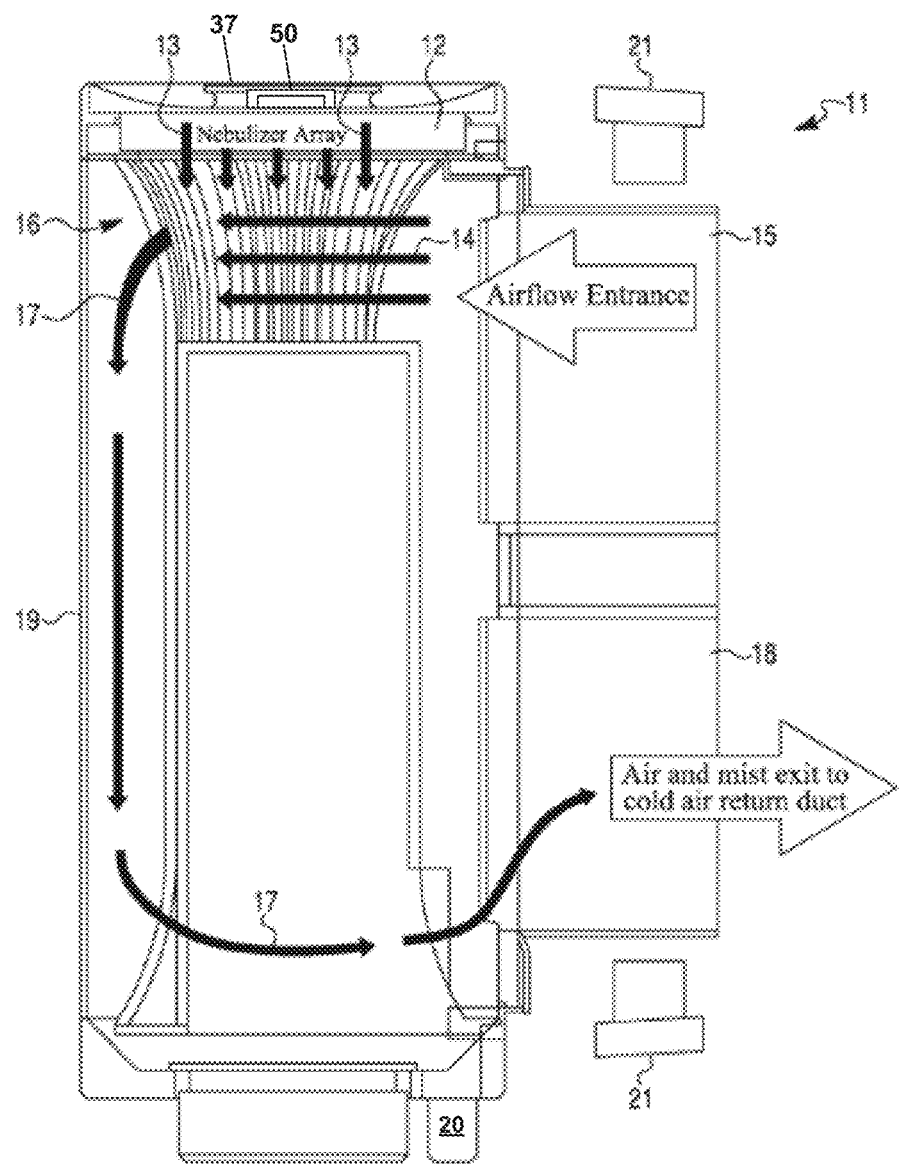
FIGS. 8 and 9 are diagrams illustrating a pill-type enclosure for a humidifier.
Figure 9:
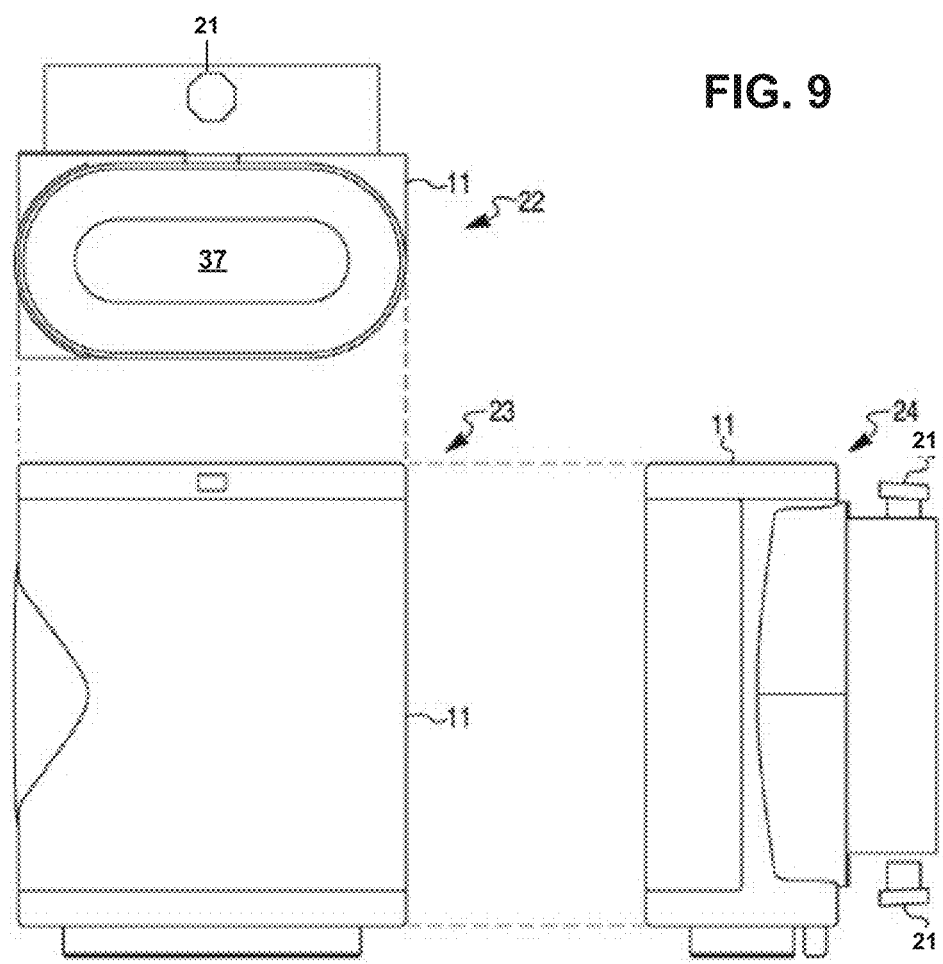
Figure 10:
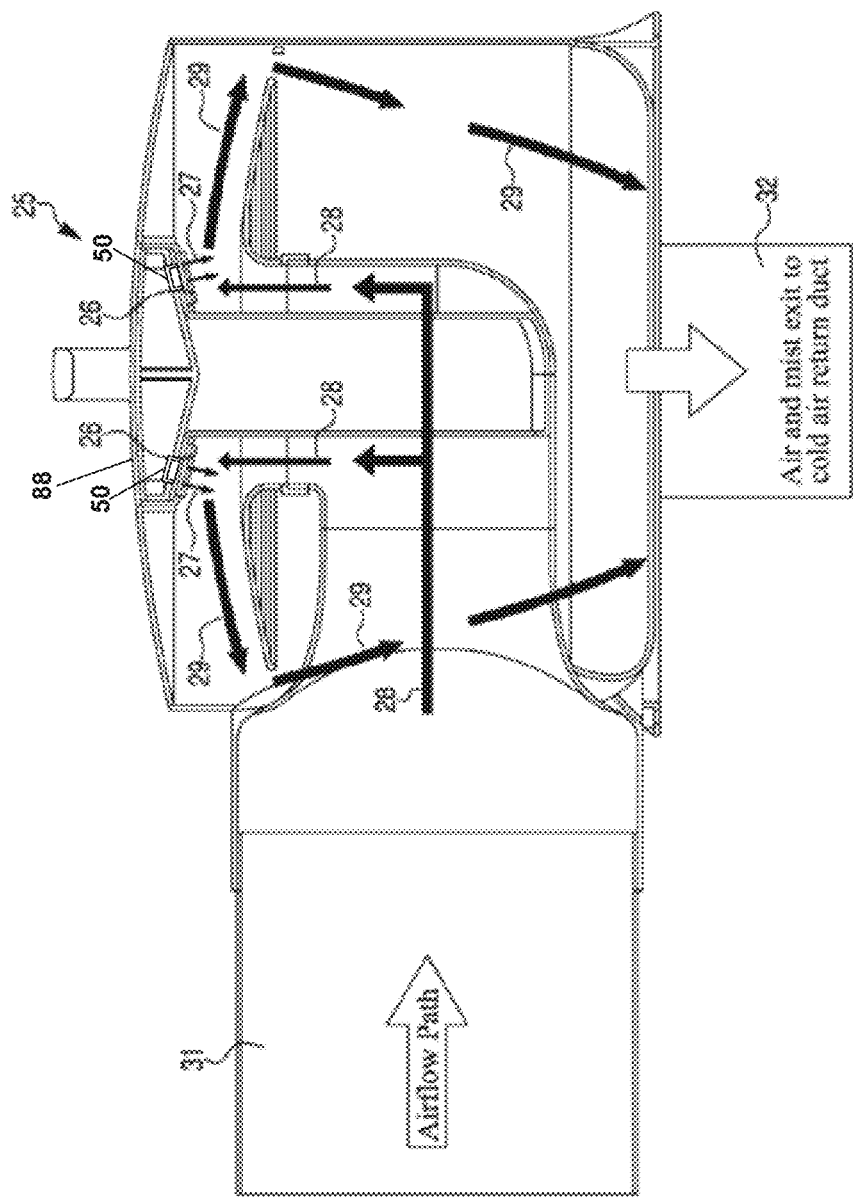
FIGS. 10 and 11 are diagrams illustrating a round-type enclosure for a humidifier.
Figure 11:
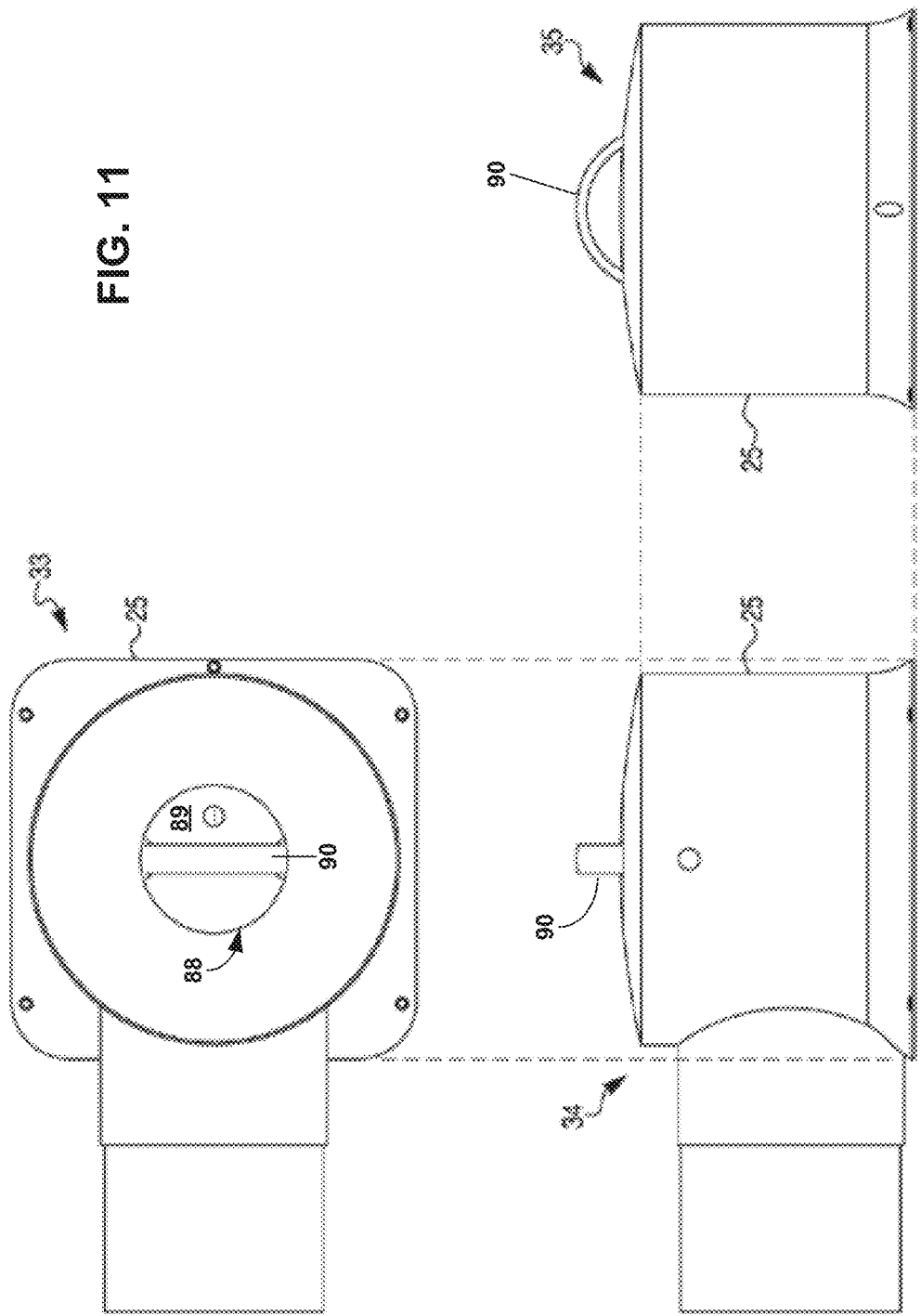
Figure 12:
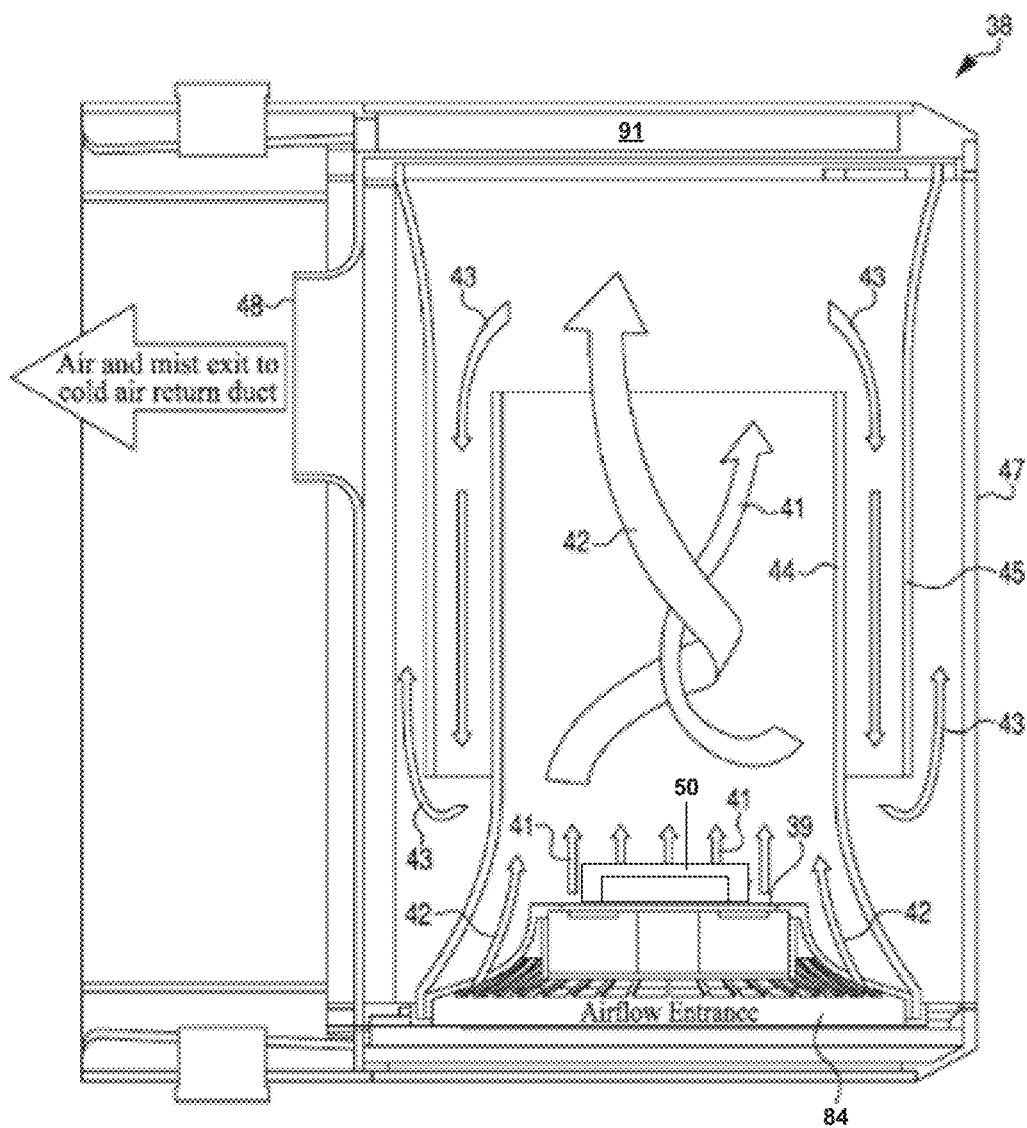
FIGS. 12 and 13 are diagrams illustrating a cyclone-type enclosure for a humidifier.
Figure 13:
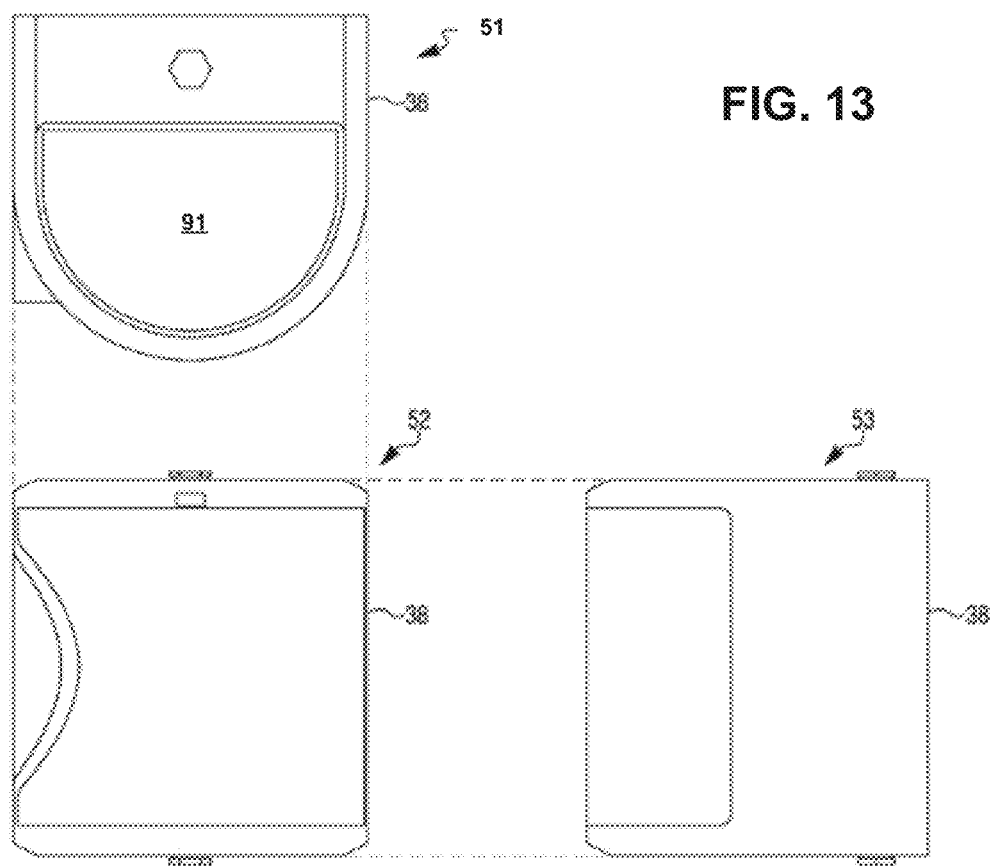
Figure 21:
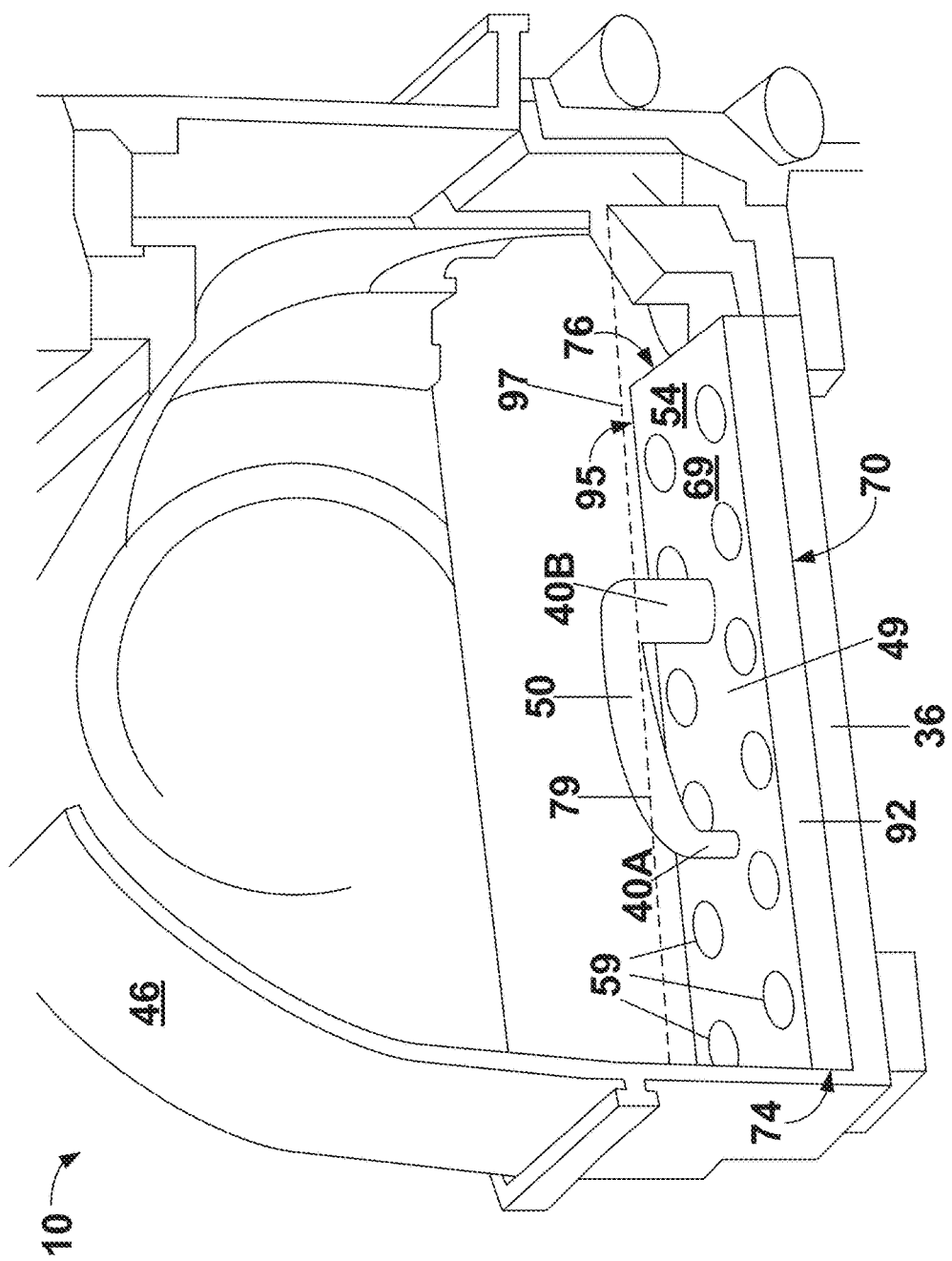
FIG. 21 is a diagram depicting an example portable humidifier system.

FIG. 21 is a diagram depicting an example humidifier device 10, in accordance with some examples of this disclosure. Humidifier 10 may be an example of humidifier enclosure 66 of FIG. 1, enclosure 11 of FIG. 8, enclosure 25 of FIG. 10, enclosure 38 of FIG. 12, enclosure 254 of FIG. 14, and/or humidifier 200 of FIG. 20. In the example of FIG. 21, humidifier device 10 represents a portable, self-contained unit. For example, instead of being connected to a water supply 62 (FIG. 1), humidifier 10 includes a hollow container 46 configured to store a limited volume of liquid, such as water. Once the water within container 46 has been expended, the container 46 must be manually refilled.

Humidifier 10 includes a removable nebulizer cartridge 49, which may be an example of nebulizer arrays 56-58 of FIG. 1. For example, nebulizer cartridge 49 may include one or more spray units 59 configured to vaporize the water supply contained within container 46, as detailed further above. Cartridge 49 includes a cartridge housing 54 having a generally rectangular-prism shape, defining a top side 69, a bottom side 70, a front side 92, a back side 95, a left side 74, and a right side 76. Bottom side 70 of cartridge 79 is configured to contact a bottom surface 36 of container 46. For example, bottom side 70 of cartridge 49 may include one or more physical features or mechanisms configured to interlock or connect with corresponding or matching features on bottom surface 36 of container 46.

In accordance with some examples of this disclosure, top side 69 of nebulizer cartridge 49 includes a handle 50 configured to enable a user to easily install nebulizer cartridge 49 within container 46. Similarly, handle 50 may enable a user to easily remove nebulizer cartridge 49 from within container 46 when nebulizer cartridge 49 needs to be replaced (e.g., at the end of its useful lifespan).

In some examples, handle 50 may be integrated within cartridge housing 54, for example, formed from or molded into a single coherent unit. In other examples, handle 50 may be a distinct component from cartridge housing 54, but rigidly coupled to top side 69 of cartridge housing 54. For example, handle 50 may be glued, adhered, welded, bonded, or otherwise affixed to top side 69 of housing 54.

In some examples, handle 50 may include an elongated body 79 supported on either end by a respective leg 40A, 40B (collectively, "legs 40"). In some examples, such as the example shown in FIG. 21, leg 40B may be longer or taller than leg 40A, such that elongated body 79 is non-parallel with top side 69 of cartridge housing 54. In some examples, legs 40 may both be long enough such that elongated body 79 extends vertically above a water fill line 97, so that a user may use handle 50 to replace the cartridge 49 while water remains within container 46.

In the example shown in FIG. 21, top side 69 of cartridge housing 54 includes two rows of spray units 59, each row having six spray units 59. In other examples, cartridge housing 54 may define any number of spray units 59. Handle 50 is disposed in between, and parallel to, the two rows of spray units 59. In other examples, handle 50 may be located in a different location on top surface 69, or in other examples, on a different surface of cartridge housing 54.

Any publication or patent document noted herein is hereby incorporated by reference to the same extent as if each publication or patent document was specifically and individually indicated to be incorporated by reference. In the present specification, some of the matter may be of a hypothetical or prophetic nature although stated in another manner or tense. Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications. Various examples of the disclosure have been described. These and other examples are within the scope of the following claims.

The invention claimed is:

1. A humidifier comprising:
   a container for containing a fluid;
   cartridge for nebulizing the fluid, the cartridge configured to be fixed inside the container, the cartridge comprising:
      a cartridge housing comprising:
         a first side that is configured to eject droplets of the fluid,
         a second side opposite to the first side;
      a handle located on one of the first side or the second side of the cartridge housing, wherein the handle comprises an elongated body and two legs,
         projects away from the cartridge housing,
         is configured to remove the cartridge from the humidifier, and
         is configured to install the cartridge to the humidifier; and
      wherein the elongated body and legs defines a space between the cartridge housing and the handle.

2. The humidifier of claim 1, the cartridge further comprising a plurality of spray units configured to eject the droplets of the fluid.

3. The humidifier of claim 2, wherein:
   each spray unit comprises a nebulizer comprising a plate having one or more holes with diameters between one and one hundred microns and a piezoelectric material attached to the plate; and
   the piezoelectric material has an opening that encloses the one or more holes of the plate.

4. The humidifier of claim 3, wherein the piezoelectric material actuates the plate to vibrate at a frequency according to an AC current applied to the piezoelectric material.

5. The humidifier of claim 4, wherein the frequency comprises a resonant frequency of the plate of the nebulizer.

6. The humidifier of claim 1, wherein the handle is integrated with the cartridge housing.

7. The humidifier of claim 1, wherein the handle is distinct from, and rigidly coupled to, the cartridge housing.

8. The humidifier of claim 2, wherein the cartridge comprises two rows of spray units, and wherein the handle is disposed between the two rows.

9. The humidifier of claim 1, wherein the handle extends above a water-fill line of the container.

10. The humidifier of claim 1, wherein the elongated body is non-parallel with the first surface of the cartridge housing.

11. A device comprising a cartridge for nebulizing a fluid, the cartridge configured to be fixed inside a container containing the fluid, the cartridge comprising:
   a cartridge housing comprising:
      a first side that is configured to eject droplets of the fluid,
      a second side opposite to the first side;
   a handle located on one of the first side or the second side of the cartridge housing, wherein the handle:
      comprises an elongated body and two legs,
      projects away from the cartridge housing,
      is configured to remove the cartridge from the humidifier, and is configured to install the cartridge to the humidifier; and wherein the elongated body and legs defines a space between the cartridge housing and the handle.

12. The device of claim 11, the cartridge further comprising a plurality of spray units configured to eject the droplets of the fluid.

13. The device of claim 12, wherein:

each spray unit comprises a nebulizer comprising a plate having one or more holes with diameters between one and one hundred microns and a piezoelectric material attached to the plate; and the piezoelectric material has an opening that encloses the one or more holes of the plate.

14. The device of claim 13, wherein the piezoelectric material actuates the plate to vibrate at a frequency according to an AC current applied to the piezoelectric material.

15. The device of claim 14, wherein the frequency comprises a resonant frequency of the plate of the nebulizer.

16. The cartridge of claim 11, wherein the handle is integrated with the cartridge housing.

17. The cartridge of claim 11, wherein the handle is distinct from, and rigidly coupled to, the cartridge housing.

18. The device of claim 12, wherein the cartridge comprises two rows of spray units, and wherein the handle is disposed between the two rows.

19. The device of claim 11, wherein the handle extends above a water-fill line of the container.

20. The device of claim 11, wherein the elongated body is non-parallel with the first surface of the cartridge housing.

\* \* \* \* \*